United States Patent
Rivaud et al.

(10) Patent No.: US 10,012,811 B2
(45) Date of Patent: Jul. 3, 2018

(54) MID-BOARD PLUGGABLE OPTICAL DEVICES, ASSEMBLIES, AND METHODS

(71) Applicant: Ciena Corporation, Hanover, MD (US)

(72) Inventors: Daniel Rivaud, Ottawa (CA); Kevin Estabrooks, Nepean (CA); Gregory Vanderydt, Ottawa (CA)

( * ) Notice: Subject to any disclaimer, the term of this patent is extended or adjusted under 35 U.S.C. 154(b) by 11 days.

(21) Appl. No.: 15/364,451

(22) Filed: Nov. 30, 2016

(65) Prior Publication Data

US 2018/0149819 A1 May 31, 2018

(51) Int. Cl.
  *G02B 6/42* (2006.01)
  *G02B 6/38* (2006.01)
  *H01R 31/06* (2006.01)

(52) U.S. Cl.
  CPC ......... *G02B 6/4292* (2013.01); *G02B 6/3814* (2013.01); *G02B 6/3817* (2013.01); *G02B 6/4278* (2013.01); *H01R 31/06* (2013.01)

(58) Field of Classification Search
  CPC .................................................. G02B 6/4278
  See application file for complete search history.

(56) References Cited

U.S. PATENT DOCUMENTS

| 2015/0253524 A1* | 9/2015 | Ito | G02B 6/423 385/92 |
| 2016/0337727 A1* | 11/2016 | Graves | H04Q 11/0005 |

* cited by examiner

*Primary Examiner* — Jerry Rahll
(74) *Attorney, Agent, or Firm* — Clements Bernard Walker PLLC; Christopher L. Bernard; Lawrence A. Baratta, Jr.

(57) ABSTRACT

A pluggable optical module, including: a pluggable module unit including an optical connector disposed at a front end portion thereof and an electrical connector disposed at a rear bottom portion thereof, wherein the optical connector is configured to be optically coupled to an optical fiber, and wherein the electrical connector is configured to be electrically coupled to an electrical connector disposed on an electrical board. Optionally, the pluggable module unit includes a pluggable module adapter secured to a pluggable module body. The electrical connector is then disposed at a rear bottom portion of the pluggable module adapter. A pluggable optical module aggregator, including: a housing; an electrical board; a plurality of electrical connectors and a bulk electrical connector consolidating and terminating the plurality of electrical connectors and accessible from the exterior of the housing; and a plurality of optical connectors and a bulk optical connector consolidating and terminating the plurality of optical connectors and accessible from the exterior of the housing.

15 Claims, 9 Drawing Sheets

MID-BOARD PLUGGABLE OPTICAL DEVICES, ASSEMBLIES, AND METHODS

FIELD OF THE INVENTION

The present invention relates generally to optical networking systems and methods. More specifically, the present invention relates to mid-board pluggable optical devices, assemblies, and methods.

BACKGROUND OF THE INVENTION

Data centers are required to move petabits of data per second, demands are constantly growing, and costs must continuously be contained in order for operations to be profitable. Space and power are key monetization considerations within data centers, driving a need for improved efficiency in the delivery of data over status quo data networking equipment designs. It would seem that data networking equipment manufacturers would take the following approaches: 1) seek multi-source agreement (MSA) consensus regarding the implementation of the reduction in size of existing transceiver pluggable form factors so as to implement improved port density of data networking gear faceplates; 2) develop new optical interface cards, cables, and connectors to reduce the amount of fiber required within a data center; and 3) achieve greater data rates per optical fiber via new, higher speed standards. To a large extent, however, these things have not occurred.

Data centers have already made significant investments in transceivers to achieve status quo data transport rates and cost favours the continued use of existing transceivers versus the adoption of, and investment into, a new set of transceivers that achieve the same status quo data transport rates. MSA consensus takes time and requires early adoption, which costs may not enable. A new transceiver form factor does not necessarily efficiently mitigate equipment faceplate surface area as a bottleneck to the number of hosted transceivers and, therefore, delivered traffic per second. Optical transceivers are pluggable in nature due to the number of possible optical interface standards, wavelengths, and transmit power levels deployed at the connected interface at the far end of the optical fiber. The development of a card that can interface with a long list of possible far end standards is likely not affordable for most manufacturers. The acceptance of a card implementing a requirement for a rigid set of far end attributes would likely not offer sufficient deployment flexibility to gain industry adoption. Further, data rates are constrained by industry adoption and limits imposed by physics.

Current solutions do not enable the strategic positioning of the aggregate housing of transceiver interfaces, such as at the top or bottom position of a rack so as to mitigate the extension of fiber deployment within the rack. Thus, current solutions do little to mitigate the space consumption and cost of the fiber itself. Further, current solutions do not make modular the relationship between a potentially "infinite" pool of aggregated transceiver interfaces with any number of data traffic motherboard\processor chassis based upon interconnection and bandwidth requirements.

Conventional data networking equipment is typically interconnected using optical fiber (a thin glass fiber through which light can be transmitted). At the termination point of the optical fiber is a polished tip, as well as a connector, that secures the alignment of the optical fiber to the transmit and receive components of the fiber optic side of a pluggable transceiver. The device facing side of these pluggable transceivers generally interconnects with the device motherboard\processor(s) using a form factor and electrical interface specified by a MSA among competing pluggable transceiver manufacturers. Pluggable transceivers generally plug individually into one of many possible MSA-compliant electrical interfaces on the front faceplate of the same physical chassis that hosts the motherboard\processor(s) that handle the ingress\egress traffic transported on the connected optical fibers.

What is still needed in the art, however, is a technology that moves the housing of the pluggable transceivers, and the connected fibers, away from the faceplate of the chassis that hosts the motherboard\processor(s), thereby enabling the strategic positioning of the aggregate housing of transceiver interfaces, such as at the top or bottom position of a rack so as to mitigate the extension of fiber deployment within the rack, and mitigating the space consumption and cost of the fiber itself. This would make modular the relationship between the potentially "infinite" pool of aggregated transceiver interfaces with any number of data traffic motherboard\processor chassis based upon interconnection and bandwidth requirements.

BRIEF SUMMARY OF THE INVENTION

Moving the housing of the pluggable transceivers and connected fibers away from the faceplate of the chassis that hosts the motherboard\processor(s) achieves the mitigation of the motherboard\processor chassis front faceplate surface area as a bottleneck to the number of transceivers connected and, therefore, the amount of traffic that can be handled by each connected device motherboard\processor. The bulk insertion of transceivers into a central, enclosed location improves the spatial efficiency and security of optical fiber management and transceiver-to-optical fiber connectivity. The delivery of traffic to one or many connected motherboard\processor(s) using aggregate electrical interface(s) per motherboard\processor chassis, instead of via many individual optical interface\fiber per remote data networking equipment ports, is a more robust and spatially efficient point of interconnect. The enablement of a modular and variable ratio of pluggable transceivers to motherboard\processor(s) that is not bound by each motherboard/processor chassis faceplate surface area is advantageous and enables the development of smaller and more power efficient motherboard\processor chassis. Further, the enablement of an improved data center rack design implementing shorter (i.e. lower cost) and "cleaner" fiber runs by allows the location of all rack transceivers at the top or bottom of a data communications equipment rack. Optical fiber deployment without the local use\space\cost of fiber connectors is thus possible.

The SFP aggregator of the present invention that hosts the pluggable transceivers of the present invention has several important characteristics. The SFP adapter of the present invention enables electrical connection when making a horizontal insertion on the board. A modular approach to on board optics is provided without changes to conventional data networking cards or SFP technologies. The present invention provides tray functionality, providing access for loading pluggable transceivers, in bulk, to a chassis without the front surface area being a bottleneck to the number of transceivers hosted. The chassis achieves efficient internal optical fiber management for the connectivity of transceivers to far end equipment, while providing electrical interfaces to one or many local processor chassis. Chassis external cable related ports include a single conduit or aggregate interface for bundled optical fiber packaging and a single conduit or aggregate interface for electrical cabling. The physical protection and security offered by the chassis presents an opportunity for minimal cable\fiber sheathing and connector deployment towards the hosted transceivers within the chassis.

Thus, the adapter of the present invention converts existing MSA compliant SFP designs to onboard optics. The aggregator mechanism\module allows pluggable transceivers to be deployed in bulk to achieve alignment to the optical fiber end polished tips as well as to the MSA compliant electrical pin connections of each transceiver, mitigating the need for the spatial consumption and some costs associated with transceiver pluggable materials, levers, as well as fiber connectors. SFP optical interfaces are available, as an option, on side facing panels, versus always being on the motherboard\processor front faceplate. Dedicated pluggable transceiver hosting, servicing one or multiple motherboard\processor chassis, is provided, versus hosting transceivers on the same chassis that hosts the motherboard\processor(s) handling the delivered traffic.

The present invention thus enables the re-use of existing transceiver investments within data centers and does not require MSA consensus for a change to the transceiver form factor. It maintains interoperability with far end equipment and does not mandate a change in the implemented interface or optical data transport standards. It maintains flexibility to connect to a range of existing optical interface transceivers. It improves the amount of data that can be exchanged with a motherboard\processor(s) without mandating a new, higher speed interface standard. It enables a modular and variable ratio of pluggable transceivers to motherboard\processor(s) that is not bound by each motherboard/processor chassis faceplate surface area. It enables modular "pay as you grow models," where the ratio of pluggable transceivers to motherboard\processor(s) is not fixed, enabling the development of smaller and more power efficient motherboard\processor chassis. Further, it enables improved data center rack design implementing shorter (i.e. lower cost) and "cleaner" fiber runs by, for example, locating all rack transceivers at the top or bottom of the data communications equipment rack.

In one exemplary embodiment, the present invention provides a pluggable optical module, including: a pluggable module unit including an optical connector disposed at a front end portion thereof and an electrical connector disposed at a rear bottom portion thereof, wherein the optical connector is configured to be optically coupled to an optical fiber, and wherein the electrical connector is configured to be electrically coupled to an electrical connector disposed on an electrical board. Optionally, the pluggable module unit includes a pluggable module adapter secured to a pluggable module body. The electrical connector is then disposed at a rear bottom portion of the pluggable module adapter. The pluggable module adapter includes electrical connectivity between the electrical connector and the pluggable module body. Optionally, the pluggable module adapter includes one or more protruding flanges along a bottom edge thereof. The one or more protruding flanges are selectively disposed beneath one or more raised rails coupled to the electrical board, thereby selectively securing the pluggable module adapter and pluggable module body to the electrical board. Optionally, the pluggable module adapter and pluggable module body are selectively secured to the electrical board by sliding the pluggable module adapter and pluggable module body horizontally along the electrical board.

In another exemplary embodiment, the present invention provides a pluggable optical module adapter, including: a pluggable module adapter body configured to be selectively secured to an end of a pluggable module; an electrical connector disposed at an end of the pluggable module adapter body configured to make electrical contact with an electrical connector disposed at an adjacent end of the pluggable module; an electrical connector disposed at a bottom of the pluggable module adapter body configured to make electrical contact with an electrical connector disposed on an electrical board; and electrical connections disposed between the electrical connector disposed at the end of the pluggable module adapter body and the electrical connector disposed at the bottom of the pluggable module adapter body. The pluggable module includes an optical connector disposed at an end thereof opposite the electrical connector. Optionally, the pluggable module adapter body also includes one or more protruding flanges along a bottom edge thereof. The one or more protruding flanges are selectively disposed beneath one or more raised rails coupled to the electrical board, thereby selectively securing the pluggable module adapter to the electrical board. Optionally, the pluggable module adapter body is selectively secured to the electrical board by sliding the pluggable module adapter horizontally along the electrical board.

In a further exemplary embodiment, the present invention provides a pluggable optical module aggregator, including: a housing; an electrical board disposed in the housing; a plurality of electrical connectors coupled to the electrical board and a bulk electrical connector consolidating and terminating the plurality of electrical connectors and accessible from the exterior of the housing; and a plurality of optical connectors coupled to the electrical board and a bulk optical connector consolidating and terminating the plurality of optical connectors and accessible from the exterior of the housing, wherein the plurality of optical connectors and the bulk optical connector are optically coupled via a plurality of optical fibers within the housing. The plurality of electrical connectors and the plurality of optical connectors are configured to collectively receive and retain a plurality of pluggable optical modules within the housing. Optionally, the plurality of pluggable optical modules are secured to the electrical board via a plurality of pluggable optical module adapters selectively secured to the plurality of pluggable optical modules. The pluggable optical module aggregator also includes one or more power supplies and one or more cooling fans disposed within the housing. The plurality of pluggable optical modules are disposed within the housing in a substantially horizontal configuration. Optionally, the plurality of pluggable optical modules are pivoted into the housing via a plurality of pivoting, spring loaded electrical connectors. Optionally, the bulk electrical connector and the bulk optical connector are accessible through a side of the housing. Optionally, the housing is configured to be disposed at the top or bottom of a rack system.

BRIEF DESCRIPTION OF THE DRAWINGS

The present invention is illustrated and described herein with reference to the various figures, in which like reference numbers are used to denote like device or assembly components/method steps, as appropriate, and in which.

DETAILED DESCRIPTION OF THE INVENTION

Again, the faceplates of conventional data networking systems are typically very crowded with port density. As port density increases, conventional modular designs primarily focus on one insertion method. SFPs slide into a rack along a horizontal plane perpendicular to the faceplate. The SFPs protrude slightly from the faceplate and the optical fibers connect to this protruding portion of the SFPs. Electrical connections are made via horizontal connections at the back of the SFPs. The use of more SFPs, more optical fibers, and more electrical connections provides more capacity, at the expense of faceplate space, including long entanglements of optical fiber.

Some conventional designs get around faceplate density issues by using mid-board optics (MBOs). This frees up space on the faceplate, allowing the user to implement specialized high density optical connectors. The disadvantage to MBOs is that the end customer essentially loses the modularity of SFPs. With MBOs, one cannot expand port density or, alternatively, one must pay for port density that is not needed.

The present invention provides modular pluggable optics with the increased faceplate efficiency of MBOs by providing a novel insertion method that allows modular pluggable optics to sit mid-board.

Again, when SFPs are inserted into a conventional device and connected to a fiber optic network they make two connections, optical on the front side and electrical on the back side. Consideration is given here as to how these two connections are made mid-board. For example, an optical connection has less tolerance than an electrical connection. For an optical connection, polished fiber tips have to align inside an SFP housing (free of dust) and lock into place to keep the alignment. Optical connections are not served well if fibers make abrupt turns. Optical connections are best achieved via the current method, with fibers sliding into SFPs using standard connectors (e.g. LC connectors).

The standard method for achieving connections is to have motion along one axis, with mating achieved by connectors that must be on one end of the module. This is how SFPs mate to their cage, how blades mate with backplanes, how DIMMs mate with their connectors, etc. The problem is how to achieve connection when connectors are on the same axis, but pointed in opposite directions (e.g. optical on SFP front side and electrical on the SFP back side).

The present invention solves these problems in a novel way. SFPs are used as an example, but the method applies equally well for XFPs, QSFPs, CFPs, etc.—including any pluggable device that has opposed connectors on the same axis.

Figure 1:
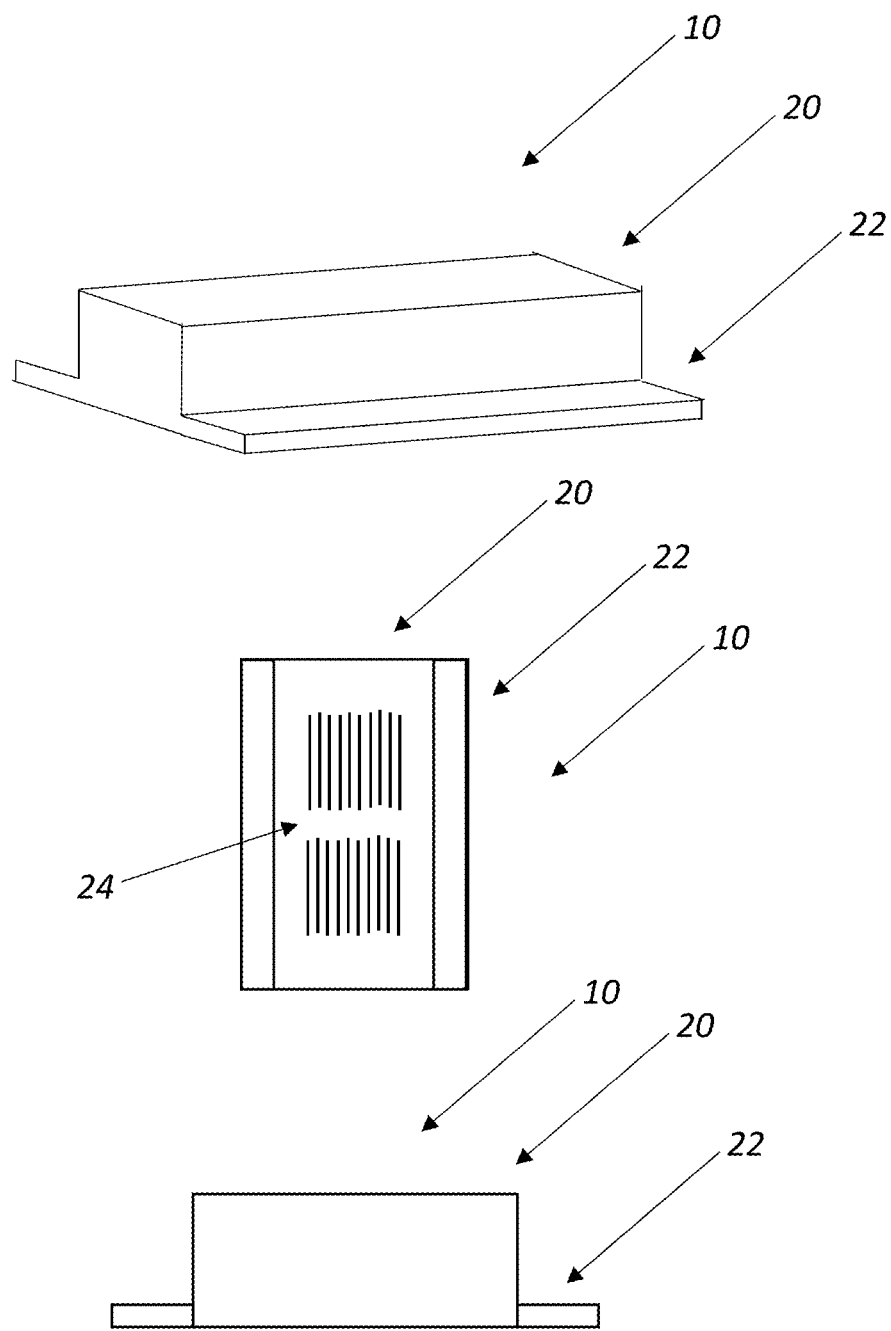
FIG. 1 provides perspective and planar (bottom and end) views of one exemplary embodiment of the pluggable module adapter of the present invention.
Figure 3:
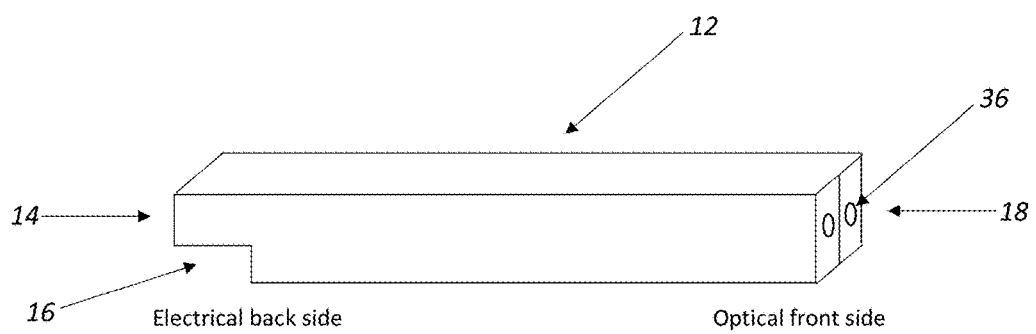
FIG. 3 provides a perspective view of one exemplary embodiment of a conventional pluggable module used with the devices and assemblies of the present invention.
Figure 4:
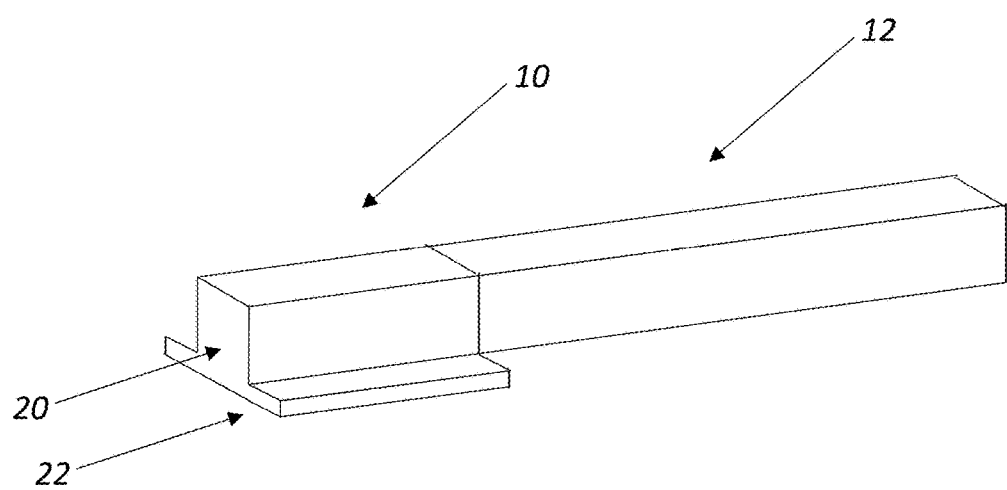
FIG. 4 provides a perspective view of one exemplary embodiment of the pluggable module adapter of the present invention securely coupled to a generic pluggable module.

Referring now specifically to FIG. 1, in one exemplary embodiment, the pluggable module adapter 10 of the present invention moves the electrical connections of a pluggable module 12 (FIG. 3) from the conventional rear facing back end 14 (FIG. 3) of the pluggable module 12 to the bottom facing back end 16 (FIG. 3) of the pluggable module 12. The optical connections of the pluggable module 12 remain on the conventional front facing front end 18 (FIG. 3) of the pluggable module 12. The pluggable module adapter 10 includes a prismatic body 20 that typically approximates the prismatic structure of the pluggable module 12. For example, in the exemplary embodiment illustrated, both the prismatic body 20 of the pluggable module adapter 10 and the prismatic structure of the pluggable module 12 are substantially rectangular or box shaped. The bottom edge of the pluggable module adapter 10 also includes a plurality of protruding flanges 22. In use, the pluggable module adapter 10 is secured to the pluggable module 12 via any suitable connection mechanism, providing electrical connectivity from the pluggable module 12 through the pluggable module adapter 10. Accordingly, the pluggable module adapter 10 may be coupled to the pluggable module 12, at least in part, via the same type of connector that is typically used to couple the pluggable module 12 to the board in a conventional rack. Finally, the bottom of the pluggable module adapter 10 includes downward facing electrical connections 24 that are suitable for contacting and mating with upward facing electrical connections provided in the pluggable module aggregator of the present invention, as described in greater detail herein below. The pluggable module adapter 10, and connected pluggable module 12, are secured within this pluggable module aggregator, at least in part, by the protruding flanges 22 of the pluggable module adapter 10 and corresponding rail structures provided with the pluggable module aggregator, as also described in greater detail herein below. FIG. 4 illustrates the pluggable module adapter 10 of the present invention securely coupled to a generic pluggable module 12.

Figure 2:
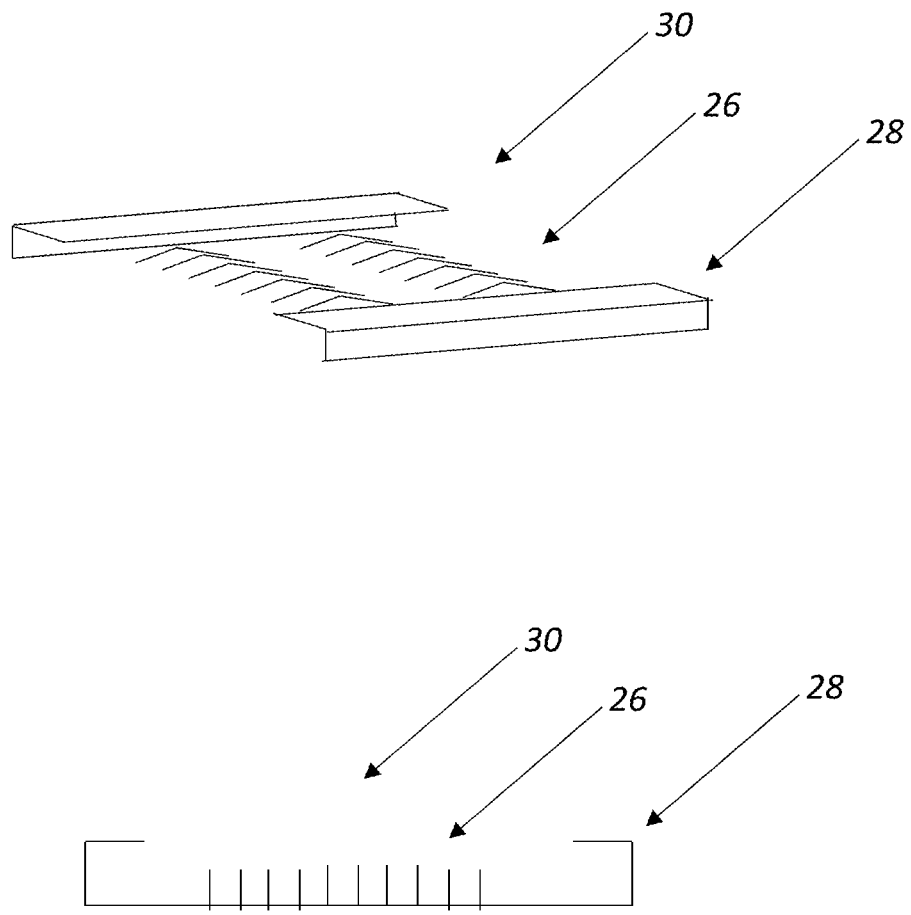
FIG. 2 provides perspective and planar (end) views of one exemplary embodiment of the electrical connector disposed on the board of a pluggable module aggregator of the present invention and used in conjunction with the pluggable module adapter and pluggable module of the present invention.

FIG. 2 provides perspective and planar (end) views of one exemplary embodiment of the electrical connector 30 disposed on the board 42 (FIG. 7) of the pluggable module aggregator of the present invention (described in greater detail herein below) and used in conjunction with the pluggable module adapter 10 (FIGS. 1 and 4) and pluggable module 12 (FIGS. 3 and 4) of the present invention. In this exemplary embodiment, the electrical connector 30 includes a plurality of upward facing, spring loaded electrical contacts 26 arranged as appropriate to selectively mate with the downward facing electrical connections 24 (FIG. 1) of the pluggable module adapter 10. In this exemplary embodiment, the electrical contacts 26 include a plurality of V-shaped metallic strips that are spaced apart from one another and arranged in spaced apart rows. The electrical contacts 26 are surrounded by raised rail structures 28 each including vertical and horizontal members that are configured to engage and retain the protruding flanges 22 (FIG. 1) of the pluggable module adapter 10 when the pluggable module adapter 10 is slid through the opposed open ends of the raised rail structures 28. Other retention mechanisms for securing the pluggable module adapter 10 to the board 42 adjacent to the electrical contacts 26 such that the upward facing electrical contacts 26 of the board 42 are electrically coupled to the downward facing electrical connections 24 of the pluggable module adapter 10 may also be utilized.

Figure 5:
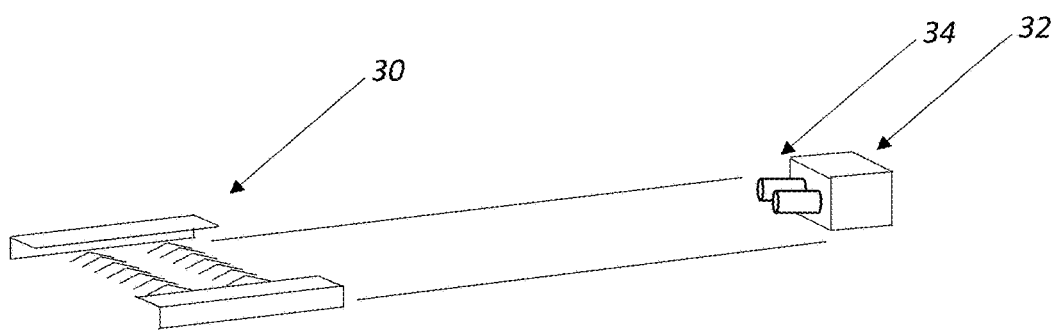
FIG. 5 provides a perspective view of one exemplary embodiment of the electrical and optical connectors disposed on the board of the pluggable module aggregator of the present invention and used in conjunction with the pluggable module adapter and pluggable module of the present invention.

FIG. 5 provides a perspective view of one exemplary embodiment of the electrical connector 30 and an optical connector 32 disposed on the board 42 (FIG. 7) of the pluggable module aggregator of the present invention (described in greater detail herein below) and used in conjunction with the pluggable module adapter 10 (FIGS. 1 and 4) and pluggable module 12 (FIGS. 3 and 4) of the present invention. The electrical connector 30 is described herein above. The optical connector 32 includes a conventional fixed LC optical connector or the like, suitable for make an optical connection with the pluggable module 12 in a conventional manner. Accordingly, the optical connector 32 includes connectorized protruding optical fibers 34 that engage corresponding connectorized holes 36 (FIG. 3) associated with the pluggable module 12.

Figure 6:
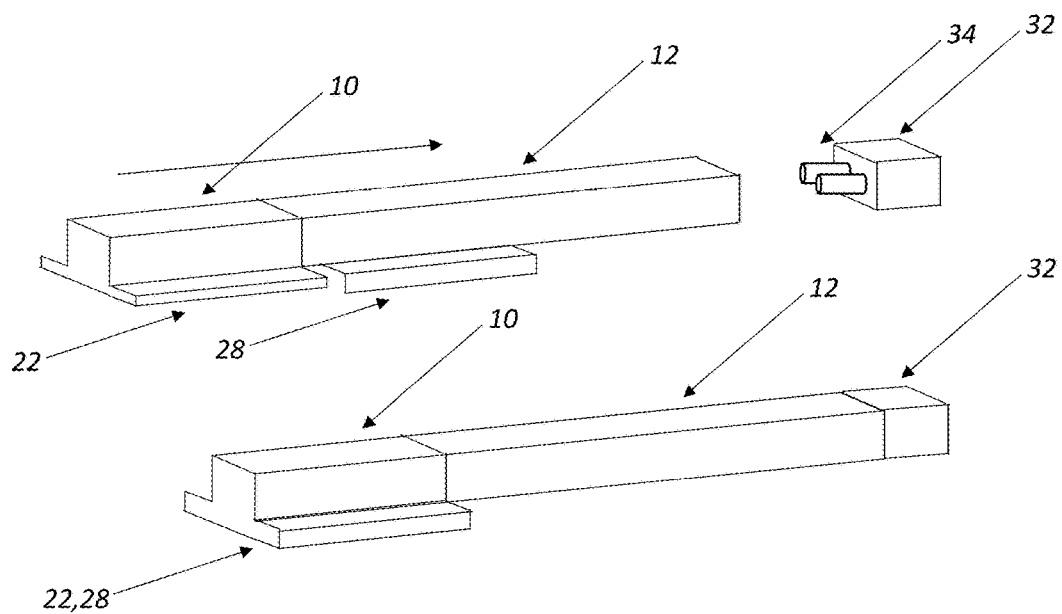
FIG. 6 provides perspective views of one exemplary embodiment of the pluggable module adapter and pluggable module being slidingly inserted into raised rail structures disposed on the board of the pluggable module aggregator of the present invention, thereby completing the electrical connections with the electrical connector disposed on the board and the optical connector disposed on the board.

FIG. 6 provides perspective views of one exemplary embodiment of the pluggable module adapter 10 and pluggable module 12 being slidingly inserted into the raised rail structures 28 disposed on the board 42 (FIG. 7), thereby completing the electrical connections with the electrical connector 30 (FIGS. 2 and 5) disposed on the board 42 and the optical connector 32 disposed on the board 42. Specifically, when the pluggable module 12 is slid horizontally along the board 42 between the raised rail structures 28, the protruding flanges 22 of the pluggable module adapter 10 engage the raised rail structures 28, securing the pluggable module adapter 10 and pluggable module 12 to the board 42 and completing the electrical connections between the pluggable module adapter 10 and the electrical contacts 26 (FIG. 2) on the board 42 and the optical connections between the pluggable module 12 and the optical connector 32 on the board 42.

Figure 7:
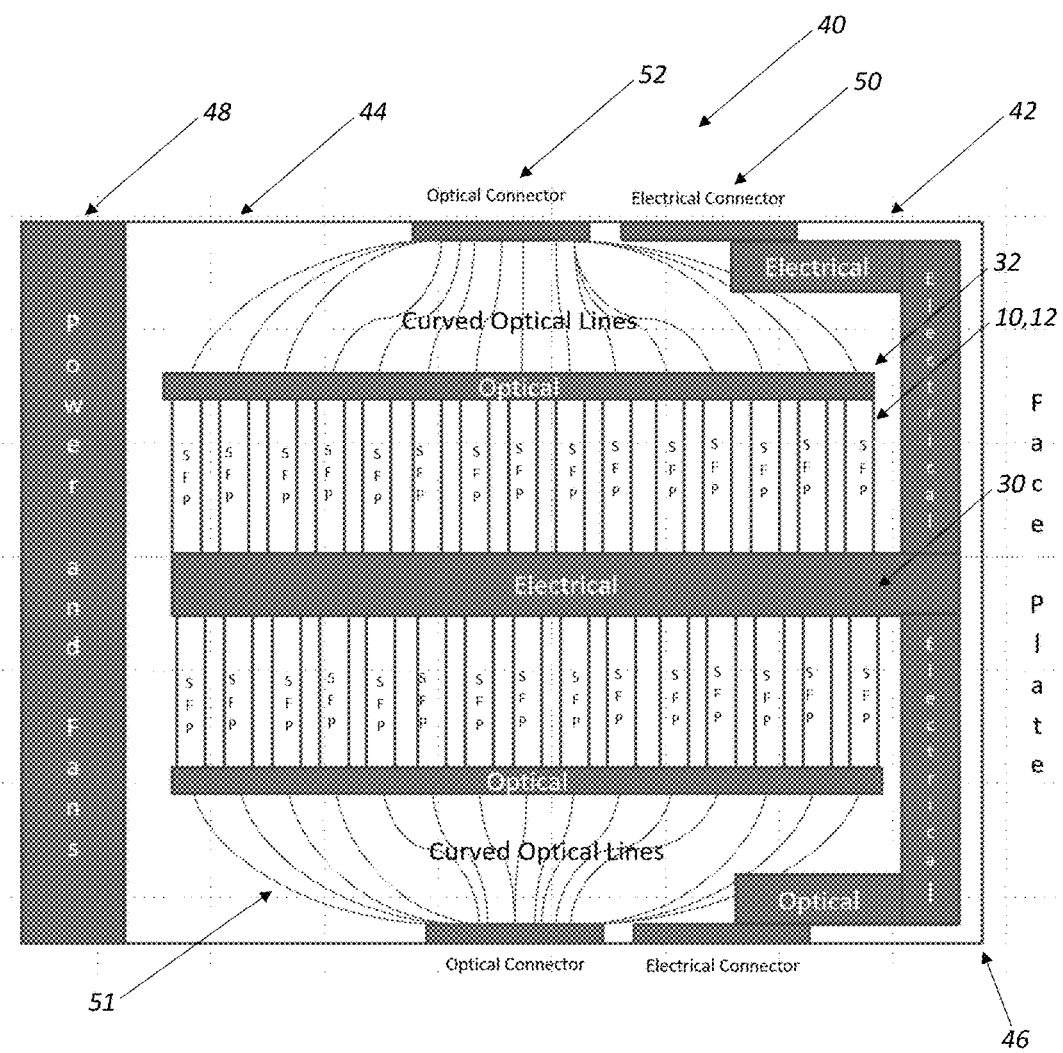
FIG. 7 provides an internal planar view of one exemplary embodiment of the pluggable module aggregator of the present invention.
Figure 8:
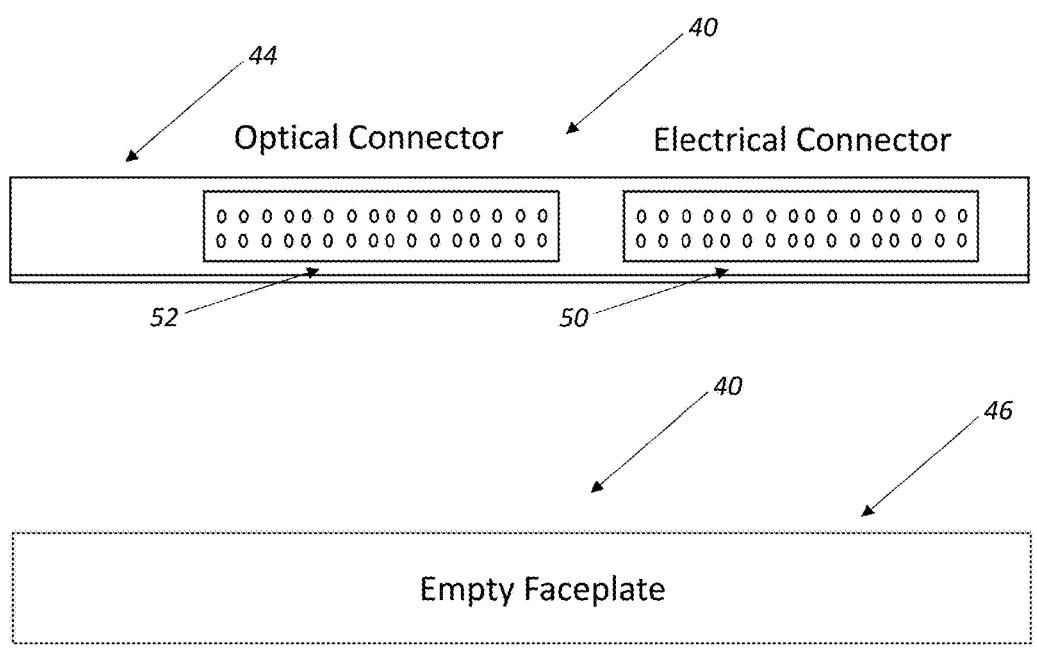
FIG. 8 provides external planar (side, front, and top) views of one exemplary embodiment of the pluggable module aggregator of the present invention.
Figure 8:
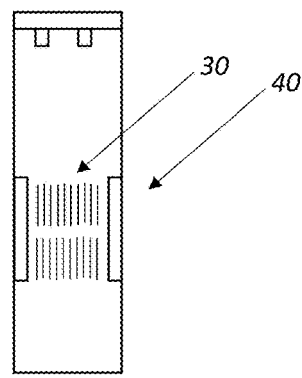

Referring now specifically to FIGS. 7 and 8, in one exemplary embodiment, the pluggable module aggregator 40 of the present invention is an assembly that houses optics separate from compute devices and delivers compact electrical connections to the compute devices. This has the advantage of freeing up space on switches, routers, etc., as the pluggable modules 12 are no longer required in the design of the switches, routers, etc. The pluggable modules 12 in the pluggable module aggregator 40 are aligned efficiently and face the sides of the housing 44. This allows the fiber connections to feed directly from the side fiber channel into the pluggable module aggregator 40 and not feed into the faceplate 46. As is illustrated, the board 42 is disposed within a housing 44, providing a thin box or tray-like structure including a faceplate 46. Power and ventilation 48 is provided near the back of the housing 44 via conventional power supplies and fans, for example. The pluggable modules 12 are arranged horizontally side by side along the length of the housing 44. The pluggable module adapters 10 and pluggable modules 12 engage a plurality of electrical connectors 30 lined up on the board 42 along the central portion of the housing 44 and a plurality of optical connectors 32 lines up on the board 42 along the side portions of the housing 44. Others physical configurations can be used, provided that adequate pluggable module density is achieved. The electrical connectors 30 are consolidated and terminate to one or more bulk electrical connectors 50 disposed through the sides of the housing 44. Similarly, the optical connectors 32 are consolidated and terminate to one or more bulk optical connectors 52 via a plurality of internal optical fiber runs 51. In this manner, external electrical wires and optical fibers can be consolidated and bundled to the bulk optical connectors 50 and bulk optical connectors, respectively, and the housing 44 may be disposed at the top or bottom of the associated rack (not illustrated), such that the length and complexity of wire and fiber runs can be minimized. Again, the pluggable module aggregator 40 provides a modular consolidation point for the electrical/optical connection points for the optical networking system. The faceplates (not illustrated) of the various rack components are thereby kept free from the clutter of protruding pluggable modules 12 and connected optical fibers. In most cases the electrical and optical connectors 50 and 52 are disposed on the sides of the pluggable module aggregator 40. However, the connectors 50 and 52 can be placed in the front, back, top, or bottom as well. The pluggable modules 12 can also be mounted on sliders so that they can slide out for easy replacement. The empty faceplate 46 of the housing 44 can be used for OAM functions, LEDs, displays, etc.

Figure 9:
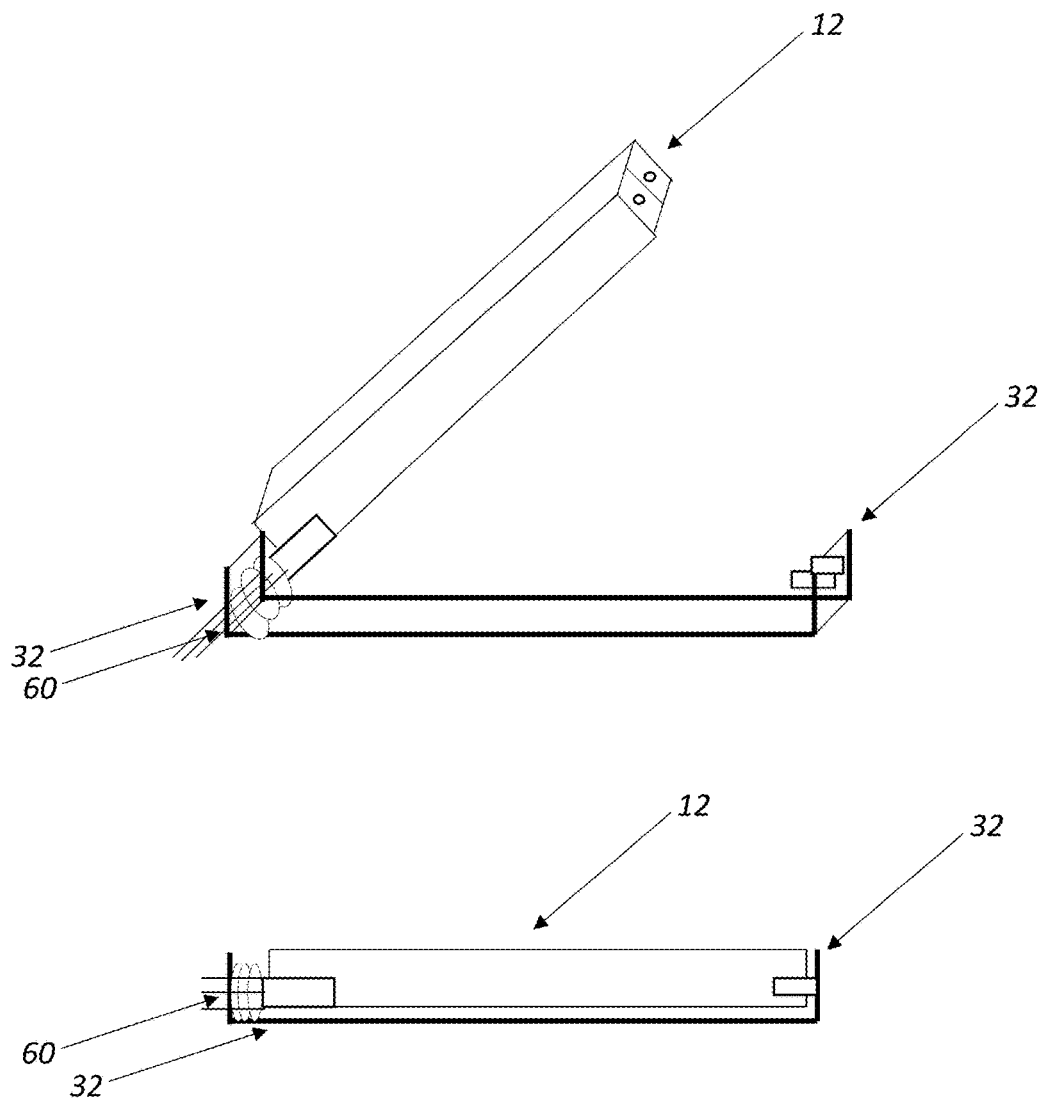
FIG. 9 provides perspective and planar (side) views of another exemplary embodiment of a methodology for inserting the pluggable modules of the present invention into the pluggable module aggregator of the present invention, without the use of the pluggable module adapter of the present invention.

FIG. 9 provides perspective and planar (side) views of another exemplary embodiment of a methodology for inserting the pluggable modules 12 of the present invention into the pluggable module aggregator 40 of the present invention or the like, without the use of the pluggable module adapter 10 (FIGS. 1, 4, and 6) of the present invention. The electrical connection 30 is flexible and mounted on a spring 60. The user inserts the electrical connection, compressing the spring 60, and then folds the pluggable module 12 downwards until the pluggable module 12 is in a horizontal position. As the pluggable module 12 is released, the spring 60 applies pressure, thereby securing the optical connection 32.

Although the present invention is illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following non-limiting claims.

What is claimed is:

1. A pluggable optical module, comprising:
   a pluggable module unit comprising an optical connector disposed at a front end portion thereof and an electrical connector disposed at a rear bottom portion thereof, wherein the pluggable module unit comprises a pluggable transceiver,
   wherein the optical connector is configured to be optically coupled to an optical fiber,
   wherein the electrical connector is configured to be electrically coupled to an electrical connector disposed on an electrical board,
   wherein the pluggable module unit comprises a pluggable module adapter secured to a pluggable module body and comprising one or more protruding flanges along a bottom edge thereof that are selectively disposed beneath one or more raised rails coupled to the electrical board, wherein the pluggable module body comprises the pluggable transceiver.

2. The pluggable optical module of claim 1, wherein the electrical connector is disposed at a rear bottom portion of the pluggable module adapter.

3. The pluggable optical module of claim 2, wherein the pluggable module adapter comprises electrical connectivity between the electrical connector and the pluggable module body.

4. The pluggable optical module of claim 1, wherein the pluggable module adapter and pluggable module body are selectively secured to the electrical board by sliding the pluggable module adapter and pluggable module body horizontally along the electrical board.

5. A pluggable optical module adapter, comprising:
a pluggable module adapter body configured to be selectively secured to an end of a pluggable module, wherein the pluggable module comprises a pluggable transceiver;
an electrical connector disposed at an end of the pluggable module adapter body configured to make electrical contact with an electrical connector disposed at an adjacent end of the pluggable module;
an electrical connector disposed at a bottom of the pluggable module adapter body configured to make electrical contact with an electrical connector disposed on an electrical board;
electrical connections disposed between the electrical connector disposed at the end of the pluggable module adapter body and the electrical connector disposed at the bottom of the pluggable module adapter body; and
one or more protruding flanges disposed along a bottom edge of the pluggable module adapter body.

6. The pluggable optical module adapter of claim 5, wherein the pluggable module comprises an optical connector disposed at an end thereof opposite the electrical connector.

7. The pluggable optical module adapter of claim 5, wherein the one or more protruding flanges are selectively disposed beneath one or more raised rails coupled to the electrical board, thereby selectively securing the pluggable module adapter to the electrical board.

8. The pluggable optical module adapter of claim 7, wherein the pluggable module adapter body is selectively secured to the electrical board by sliding the pluggable module adapter horizontally along the electrical board.

9. A pluggable optical module aggregator, comprising:
a housing;
an electrical board disposed in the housing;
a plurality of electrical connectors coupled to the electrical board and a bulk electrical connector consolidating and terminating the plurality of electrical connectors and accessible from the exterior of the housing; and
a plurality of optical connectors coupled to the electrical board and a bulk optical connector consolidating and terminating the plurality of optical connectors and accessible from the exterior of the housing,
wherein the plurality of optical connectors and the bulk optical connector are optically coupled via a plurality of optical fibers within the housing; and
wherein the plurality of electrical connectors and the plurality of optical connectors are configured to collectively receive and retain a plurality of pluggable optical modules within the housing.

10. The pluggable optical module aggregator of claim 9, wherein the plurality of pluggable optical modules are secured to the electrical board via a plurality of pluggable optical module adapters selectively secured to the plurality of pluggable optical modules.

11. The pluggable optical module aggregator of claim 9, further comprising one or more power supplies and one or more cooling fans disposed within the housing.

12. The pluggable optical module aggregator of claim 9, wherein the plurality of pluggable optical modules are disposed within the housing in a substantially horizontal configuration.

13. The pluggable optical module aggregator of claim 9, wherein the plurality of pluggable optical modules are pivoted into the housing via a plurality of pivoting, spring loaded electrical connectors.

14. The pluggable optical module aggregator of claim 9, the bulk electrical connector and the bulk optical connector are accessible through a side of the housing.

15. The pluggable optical module aggregator of claim 9, wherein the housing is configured to be disposed at the top or bottom of a rack system.

* * * * *